United States Patent [19]
Kato et al.

[11] Patent Number: 5,752,210
[45] Date of Patent: May 12, 1998

[54] METHOD AND APPARATUS FOR CONTROLLING SPEED-CHANGE TRANSIENT MODE OF AUTOMATIC TRANSMISSIONS

[75] Inventors: Yoshifumi Kato, Nishikamo-gun; Ichiro Yamauchi; Masami Fujitsuna, both of Kariya; Tsutomu Tashiro, Anjo, all of Japan

[73] Assignee: Nippondenso Co., Ltd., Kariya, Japan

[21] Appl. No.: 434,398

[22] Filed: May 3, 1995

[30] Foreign Application Priority Data

May 12, 1994 [JP] Japan ................... 6-098599

[51] Int. Cl.$^6$ ............................ F16H 59/42; G06F 17/00
[52] U.S. Cl. ...................................... 701/51; 701/58
[58] Field of Search ................ 364/424.08, 424.087, 364/424.088, 424.089, 148, 149, 160, 161, 162, 163, 165; 701/51, 58, 59, 60

[56] References Cited

U.S. PATENT DOCUMENTS

| | | | |
|---|---|---|---|
| 4,649,488 | 3/1987 | Osanai et al. | 364/424.089 |
| 4,667,540 | 5/1987 | Yagi | 364/424.089 |
| 4,747,325 | 5/1988 | Morimoto | 364/424.089 X |
| 4,799,158 | 1/1989 | Patil | 364/424.088 |
| 4,942,783 | 7/1990 | Morimoto | 364/424.089 |
| 5,123,302 | 6/1992 | Brown et al. | 364/424.089 X |
| 5,175,685 | 12/1992 | Hibi | 364/424.089 |
| 5,179,875 | 1/1993 | Brown | 364/424.089 X |
| 5,189,611 | 2/1993 | Petzold et al. | 364/424.1 |
| 5,213,012 | 5/1993 | Suzuki | 364/424.089 X |
| 5,370,016 | 12/1994 | Fujita et al. | 364/424.089 X |

FOREIGN PATENT DOCUMENTS

| | | |
|---|---|---|
| 60-227048 | 11/1985 | Japan . |
| 4131560 | 5/1992 | Japan . |
| 4337159 | 11/1992 | Japan . |

OTHER PUBLICATIONS

Hatta et al: "Development of Feedback-type Electronic Automatic Transmission", publication 901095 of Society of Automotive Technology, 1990-5—partial translation.

*Primary Examiner*—Michael Zanelli
*Assistant Examiner*—Edward J. Pipala
*Attorney, Agent, or Firm*—Cushman Darby Cushman IP Group of Pillsbury Madison & Sutro LLP

[57] ABSTRACT

An automatic transmission is controlled by the use of estimation of a disturbance so that an input shaft rotates as desired to suppress shock caused during a speed-change transient mode. The disturbance is estimated from an actual rotational speed of an input shaft of the automatic transmission and a control command value to a pressure regulating device based on a predetermined transfer function model. The disturbance may be estimated alternatively by the use of a speed change in the rotational speed of the input shaft.

9 Claims, 7 Drawing Sheets

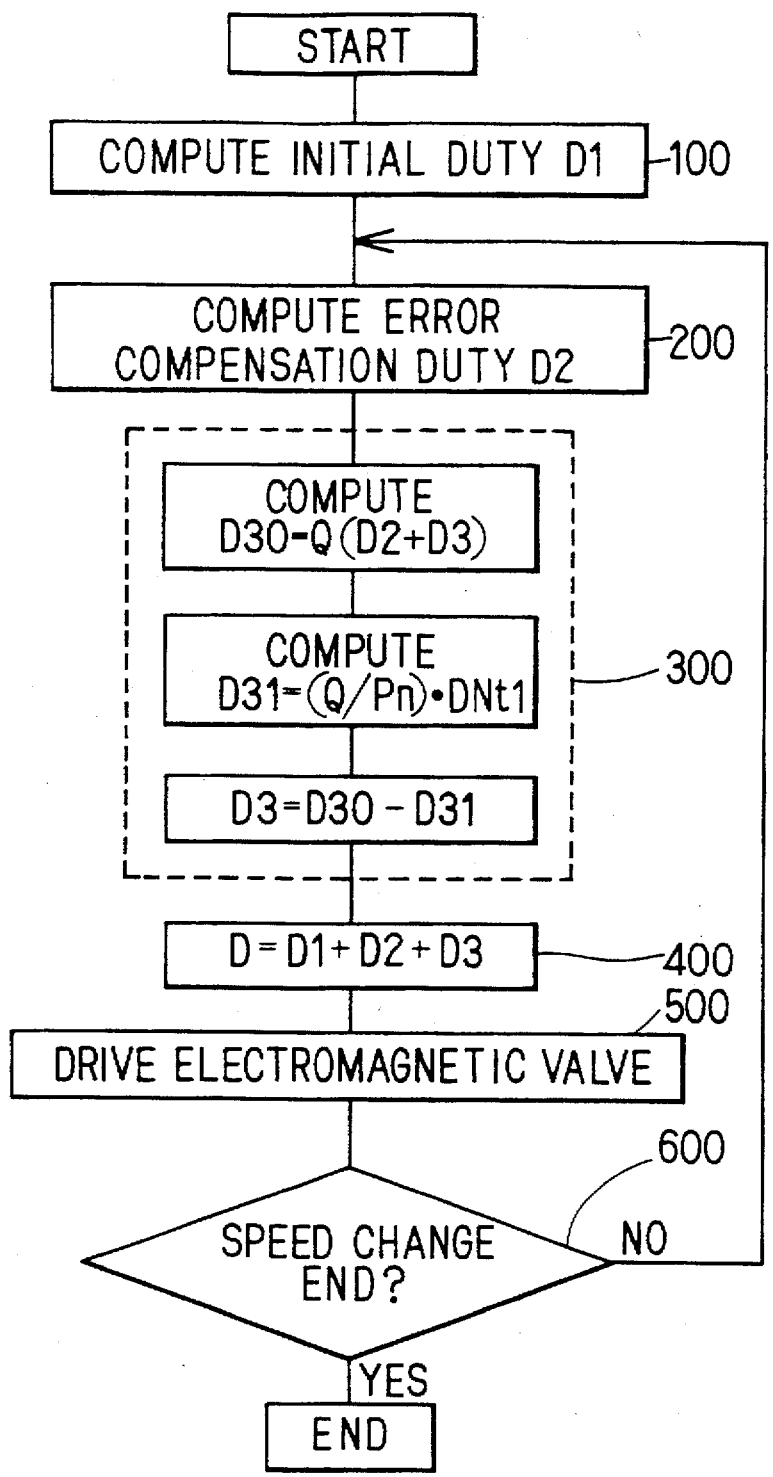

METHOD AND APPARATUS FOR CONTROLLING SPEED-CHANGE TRANSIENT MODE OF AUTOMATIC TRANSMISSIONS

CROSS REFERENCE TO RELATED APPLICATION

This application is based on and claims priority of Japanese Patent Application No. 6-98599 filed on May 12, 1994, the content of which is incorporated herein by reference.

BACKGROUND OF THE INVENTION

1. Field of the Invention

The present invention relates to a method and apparatus for controlling speed-change transient mode of automatic transmission of vehicles.

2. Description of Related Art

A conventional method and apparatus for controlling a speed-change transient mode of an automatic transmission of a vehicle is known by Japanese patent publication laid-open No. 4-337159. In this automatic transmission of a vehicle in which fluid pressure supplied to friction elements of a transmission mechanism as engagement pressure is controlled, the fluid pressure is regulated based on an error between an actual change rate in a rotational speed of an input shaft of the transmission and a target change rate of the same so that the actual change rate of the rotational speed of the input shaft is controlled to the target change rate.

According the above-referred conventional method and apparatus, because the fluid pressure control is performed based on the error between the actual change rates and the target change rate in the rotational speeds of the input shaft, it is required to change a feedback control gain, control data map or the like in correspondence to various factors, e.g., fluid temperature, speed-change gear position, torque variation of the input shaft, time-dependent change in friction coefficient of the friction elements or difference among the friction elements, time-dependent change in a pressure regulating device or difference among the pressure regulating devices, operational condition of a lock-up device, and on/off condition of a power mode (depression/release of an accelerator pedal). Therefore, it takes time for adaptation or matching work during system design and such adaptation or matching work has to be repeated each time vehicle model or specification thereof changes. Further, control program of an electronic computer for performing the desired control is complicated.

SUMMARY OF THE INVENTION

It is an object of the present invention to obviate the drawbacks in the prior art.

It is a further object of the present invention to provide a method and apparatus for controlling speed-change transient mode of an automatic transmission of a vehicle, which is effective to suppress shock by controlling a fluid pressure of a clutch and controlling an actual rotational speed or a change rate thereof of an input shaft to a predetermined calculated target value.

It is a still further object of the present invention to provide a method and apparatus for controlling speed-change transient mode of an automatic transmission of a vehicle, which requires shorter adaptation or matching work time, more simplified control program and no repeated adaptation or matching work even when type of engine and vehicle is changed.

According to the present invention, an electronic controller is provided with a transfer function model which defines a model from an input command to a fluid pressure regulating device to a rotational speed or a change rate thereof of an input shaft. When a speed change occurs, the controller estimates a rotational speed or a change rate in speed of the input shaft, using the transfer function model and the actual input command to the fluid pressure regulating device. Then the controller monitors the actual rotation speed or the change rate of the input shaft and compares the actual rotational speed or the change rate with the estimated value. In the event there occurs a difference between the actual value and the estimated value, the controller determines that a disturbance is applied to an automatic transmission and estimates the disturbance based on the difference. Then the controller corrects the input command to the fluid pressure regulating device based on the estimated disturbance.

Thus, when any error is caused in the change rate in the actual rotational speed of the input shaft relative to an output of the transfer function model during the time of speed-change transient mode due to various factors, such as changes in fluid temperature, speed-change gear position, friction elements, fluid pressure regulating device, lock-up condition of a lock-up device or the like, the error between the actual rotational speed of the input shaft or the change rate may be compensated for by the use of a simplified control data map.

BRIEF DESCRIPTION OF THE DRAWINGS

In the accompanying drawings:

FIG. 8 is a flow chart illustrating a control process according to the second embodiment.

DETAILED DESCRIPTION OF THE PREFERRED EMBODIMENTS

The present invention is described in more detail below with reference to the two presently preferred embodiments.

Figure 1:
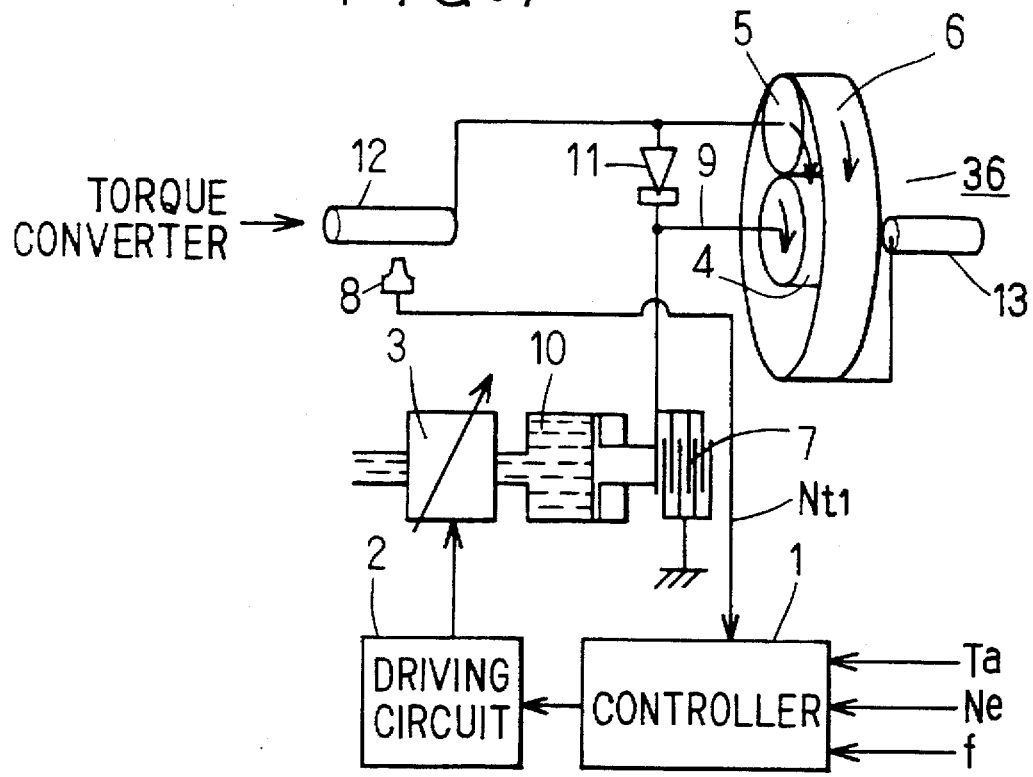
FIG. 1 is a schematic view illustrating a control apparatus for an automatic transmission according to a first embodiment of the present invention.

In FIG. 1 illustrating the first embodiment, an automatic transmission 36 for a vehicle is illustrated as having, for brevity, a speed-change gear only in a single stage, although it has planetary gears in multiple stages for speed-change operation. An electronic controller 1 is applied with various signals as inputs thereto, such as an engine coolant temperature, operating temperature of the automatic transmission, throttle opening angle or accelerator pedal position, fuel injection amount, intake air amount, engine rotational speed, or automatic transmission input shaft rotation speed. In this figure, only some of the inputs, e.g., throttle opening angle Ta, engine rotational speed Ne and fuel injection amount fo and the like, are illustrated. An output of the controller 1 is connected to a driving circuit 2 which drives an electromagnetic valve 3 provided as a pressure regulating device in a fluid line.

The electromagnetic valve 3 controls an engagement fluid pressure applied to a clutch 7 in the automatic transmission 36. In this embodiment, the electromagnetic valve 3 is a duty-controlled type and directly controls the fluid pressure applied to the clutch 7 through a piston 10.

In the transmission, when the clutch 7 is changed from a released or disengaged condition to the engaged condition, a sun gear 4 stops rotation and a planetary gear 5 starts rotating and revolving around the sun gear 4. By this operation, a ring gear 6 rotates at higher rotational speed so that the speed-change is effected between an input shaft 12 connected to a torque converter (not shown) driven by an engine (not shown) and an output shaft 13 at a wheel side. A clutch or one-way clutch 11 is disposed between the input shaft 12 and a carrier 9 carrying the sun gear 9 thereon. The clutch 11 is disengaged and engaged during the low gear and high gear operation, respectively, and slips when the gear position is changed from low to high. Thus, the clutches 5 and 11 are engaged during the low gear operation and disengaged during the transient or speed-change operation and the high gear operation. A rotational speed sensor 8 is provided to detect and apply to the controller 1 a rotational speed Nt1 of the input shaft 12.

The controller 1 computes from those signals a duty D for the electromagnetic valve 3 based on the following equation:

$$D=D1+D2+D3,$$

wherein D denotes an electromagnetic valve driving duty, D1 an initial duty of an inertia phase in which the input shaft speed changes due to gear shift from the low to high gear position, D2 a correction or compensation duty computed from an error between an actual rotational speed and a target rotational speed of the input shaft 12 by the use of PID (proportional-integral-derivative) compensation or retrieving mapped control data, and D3 an output duty for estimating a disturbance to a system and correcting or compensating the estimated disturbance.

Figure 2:
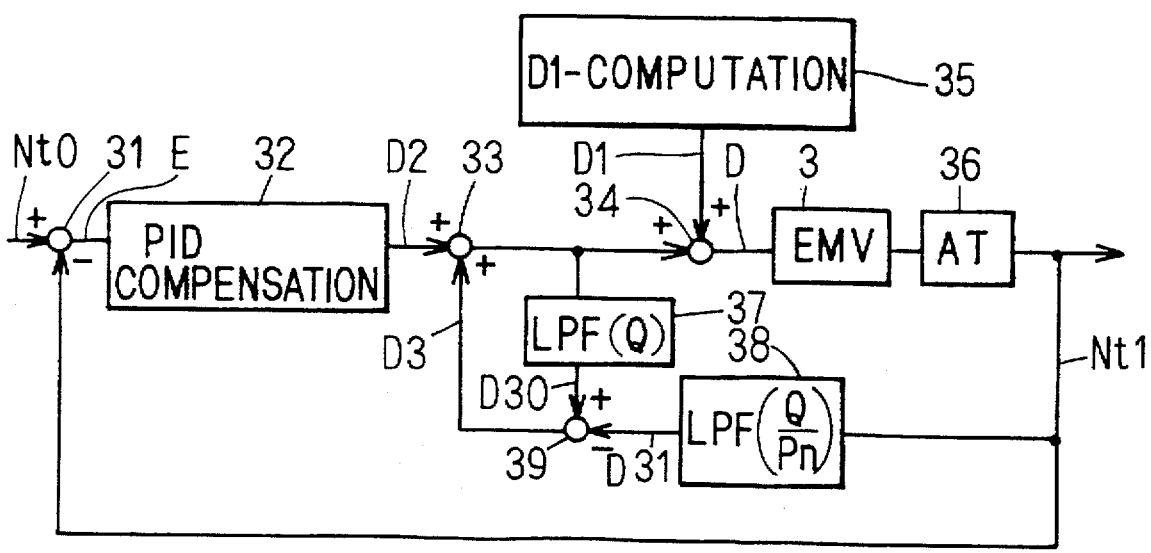
FIG. 2 is a block diagram illustrating a controller using an actual rotational speed of an input shaft as an input thereof according to the first embodiment.
Figure 3:
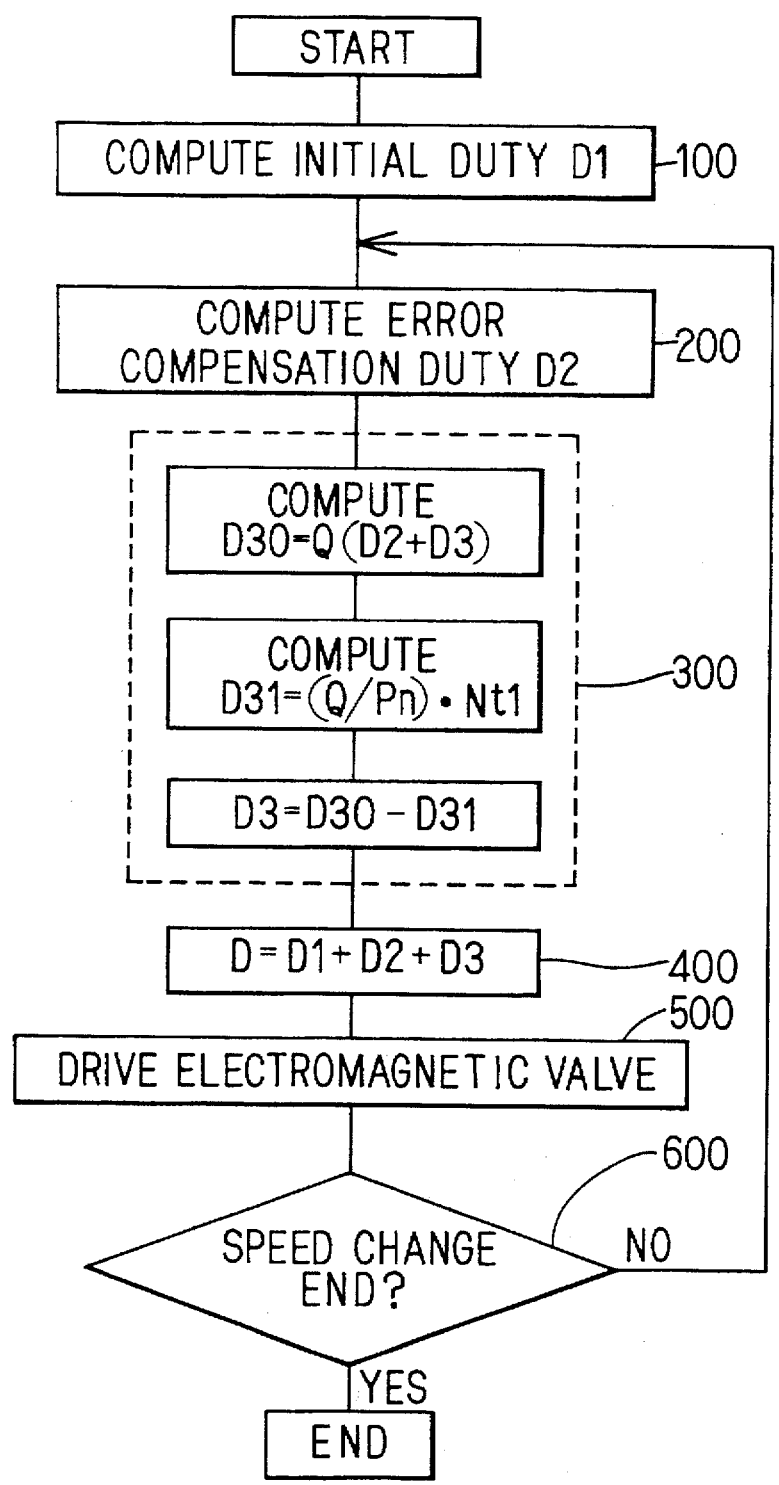
FIG. 3 is a flow chart illustrating a control process of the controller according to the first embodiment.
Figure 4A:
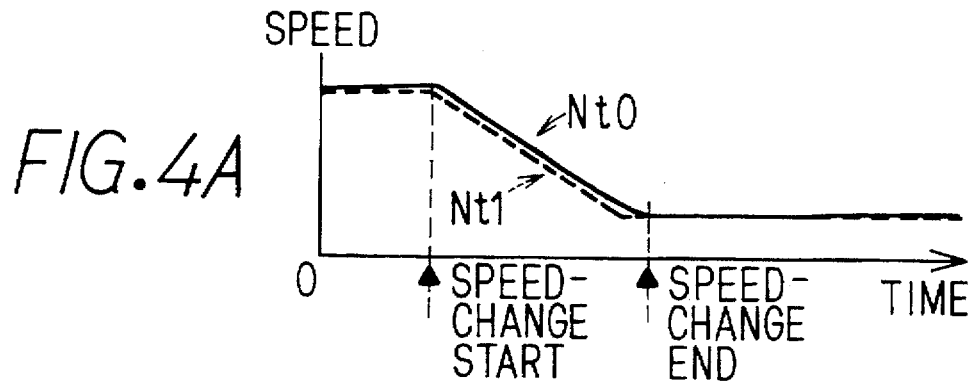
Figs. 4a through 4E are time charts illustrating speed-change control in the case of adaptation to a specified fluid line pressure.
Figure 4B:
Figure 4C:
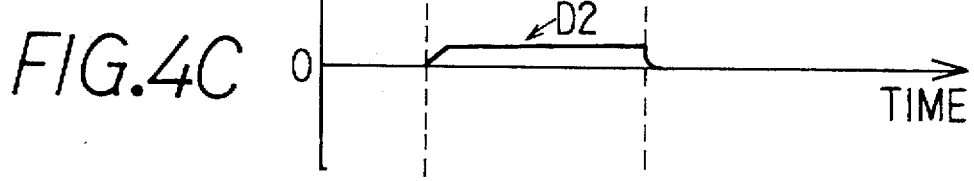
Figure 4D:
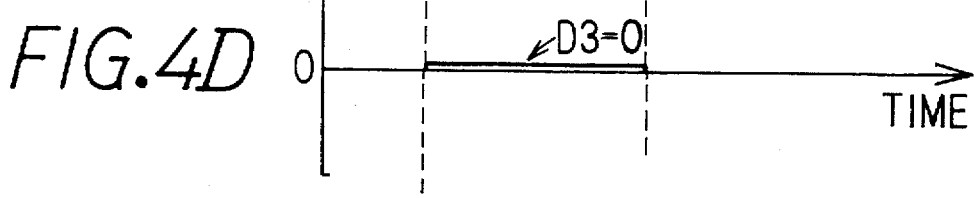
Figure 4E:
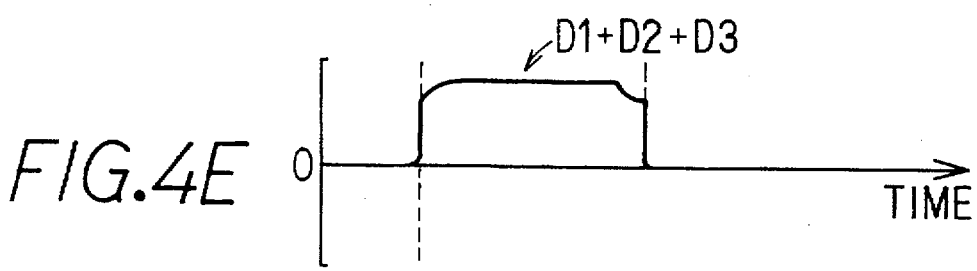
Figure 5A:
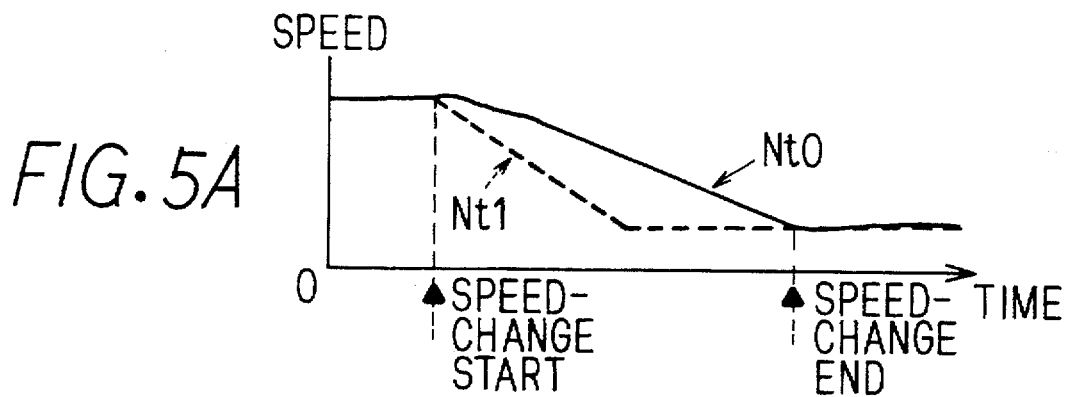
FIGS. 5A through 5D are time charts illustrating the speed-change control in the case of no correction based on a disturbance estimation at the time of the lowering of the fluid line pressure.
Figure 5B:
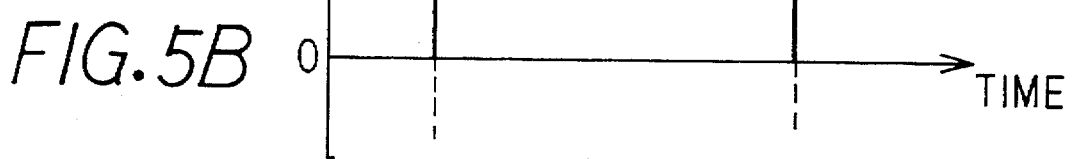
Figure 5C:
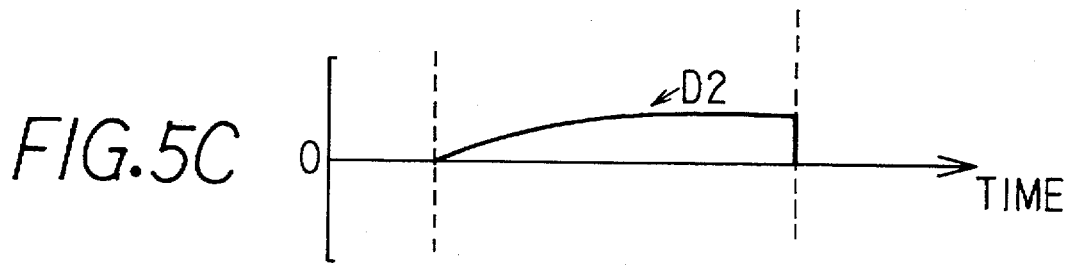
Figure 5D:
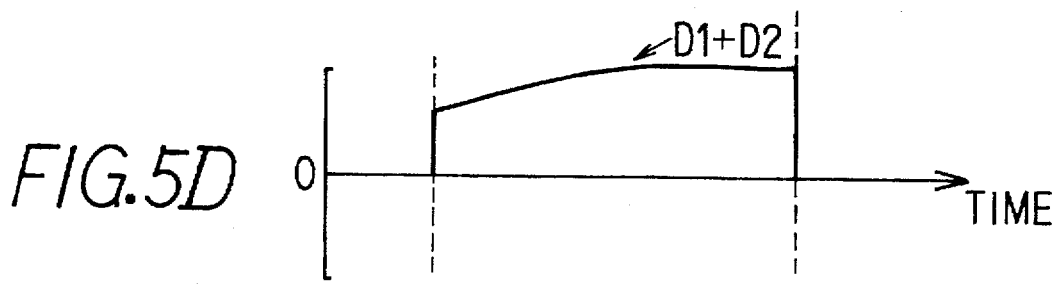
Figure 6A:
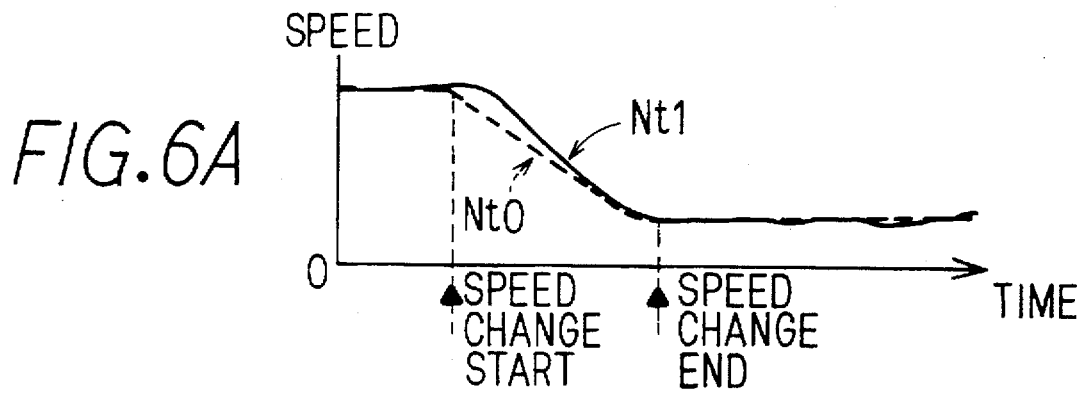
FIGS. 6A through 6E are time charts illustrating the speed-change control in the case of correction based on the disturbance estimation at the time of the lowering of the fluid line pressure in the first embodiment.
Figure 6B:
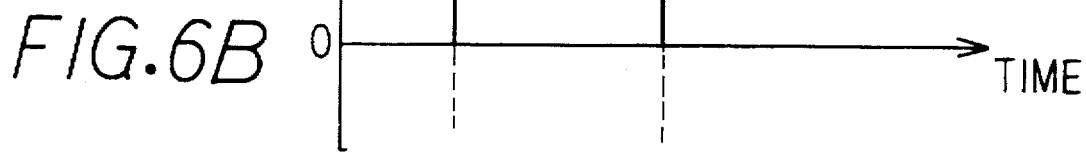
Figure 6C:
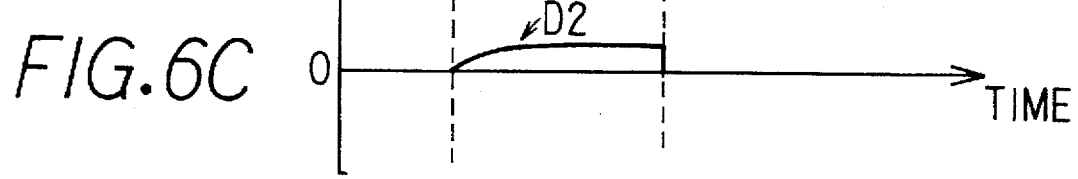
Figure 6D:
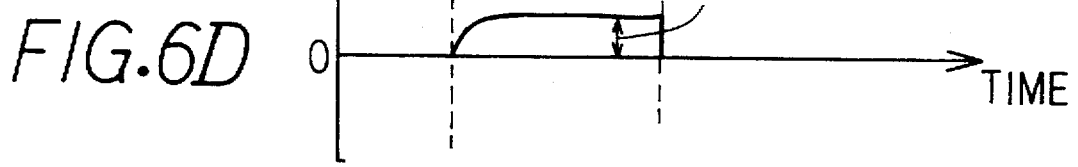
Figure 6E:
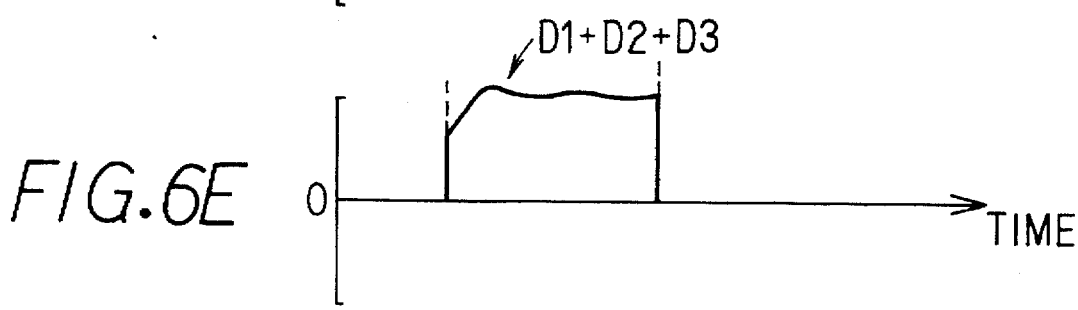

The process for computing each duty value performed by the controller 1 is illustrated in FIG. 2 in block diagram and in FIG. 3 in flow chart.

In FIG. 2, the target rotational speed Nto and the actual rotational speed Nt1 of the input shaft 12 are applied to a comparison section 31 and an error E between the two inputs is applied to a PID compensation section 32 from the comparison section 31. An output D2 of the PID compensation section 32 and an output D3 are applied to an adder section 33, and an output D2+D3 is applied to an adder section 34 and a low pass filter 37 having a predetermined transfer function Q. Together with the output from the adder section 33, an output D1 of a D1-computation section 35 is applied to the adder section 34. An output D of the comparison section 34 is applied to the electromagnetic valve 3 so that the electromagnetic valve 36 controls the automatic transmission 36. The actual rotational speed Nt1 of the input shaft 12 of the automatic transmission 36 is applied to the comparison section 31 and a low pass filter 38 having a predetermined transfer function Q/Pn. An output D31 of the low pass filter 38 is applied to a comparison section 39 together with an output D30 of the low pass filter 37.

Next, the control process performed by the controller 1 is described with further reference to FIG. 3. The process starts when a speed-change operation is commanded in the manner known well.

At a step 100, the computation section 35 in the controller 100 computes and outputs to the adder section 34 the initial duty D1 by retrieving mapped control data or by mathematical computation based on various inputs such as the speed-change gear position, throttle opening degree or accelerator pedal position, fuel injection amount, intake air amount, engine rotational speed, input shaft rotational speed, output shaft rotational speed and fluid line pressure (or the estimated value thereof). As known well in the art, the initial duty D1 may be determined experimentally in accordance with the throttle opening or accelerator position to reduce the speed-change shock and stored in the control data map for retrieval. The computation accuracy of the inertia phase initial duty D1 is not so high usually because of the disturbances such as errors in the estimated parameters and changes in the fluid temperature or engine operating points. Therefore, feedback control is required so that the speed-change period and the speed-change shock, which will otherwise become large, may be reduced.

At a next step 200, the error E between the target rotational speed Nto of the input shaft determined in advance and the actual rotational speed Nt1 of the same computed at a predetermined time interval is computed, and the compensation duty D2 is computed using the error E. Although the duty D2 may be derived by the PID compensation or by the control data map retrieval in the known manner, it is computed by the use of PID compensation method by the PID compensation section 32. The compensation duty D2 may be computed from the error E using the following equation:

$$D2=k1\times E+k2\times\int Edt+k3\times(d/dt)\times E,$$

wherein k1 and k2 denote constants determined experimentally.

At a step 300, the disturbance to the system is estimated and the output duty D3 to compensate for the disturbance is computed. At first, the duty D2+D3 being applied to the electromagnetic valve 3 is applied to the low pass filter 37 to derive the duty D30.

Next, the actual rotational speed Nt1 of the input shaft 12 is applied to the low pass filter 37 having the transfer function Q/Pn to derive the duty D31. Here, Pn denotes a transfer function model from the electromagnetic valve driving duty D for the electromagnetic valve 3 to the actual rotational speed Nt1 of the input shaft 12. It is desired generally that Pn is set in a form of an integrator, or an integrator plus a delay. Further, Q/Pn is a transfer function model which is a product of the transfer function Q of the low pass filter 37 and an inverse function of a transfer function model Pn.

The transfer function model may be defined by a single model or by a plurality of transfer function models. Further, a plurality of transfer function models predetermined in correspondence to different fluid temperature range may be provided and the transfer function models may be changed from one to the other depending on the detected actual fluid temperature.

Finally, the output duty D3 is calculated as follows.

$$D3=D30-D31$$

As described above with reference to the step 300, 1/Pn is the transfer function model covering from the actual rotational speed Nt1 of the input shaft 12 to the command duty to the electromagnetic valve 3 in the automatic transmission system. Because the duty D31 is derived by applying the actual rotation speed Nt1 of the input shaft 12 to the filter 38 having the transfer function Q/Pn, it indicates the duty value which corresponds to the current actual rotational speed Nt1 of the input shaft 12. On the contrary, the duty D30 is derived by applying the duty D2+D3 applied to the control system to the low pass filter 37. The low pass filter 37 having the transfer function Q is provided to suppress a large change in the duty D1+D2 in a short period of time and to suppress the vibratory motion of the output shaft 13.

In the event that the two duties D30 and D31 differ from each other, it means that, because of changes in the fluid temperature, speed-change gear position, input shaft torque, friction coefficient of the friction elements, pressure regulating device, lock-up device operating condition and on/off condition of the power mode (i.e. depression/release of the accelerator pedal) in the automatic transmission system, the characteristics of the controlled object changes and the input rotational speed of the input shaft corresponding to the duty D30 is not observed. The duty D3(D3=D30–D31) results in a value which includes therein influence of the disturbance. Thus, at the step 300, the influence of the disturbance can be compensated by the duty D3.

Net, in a step 400, the electromagnetic valve driving duty D is computed as follows.

$$D=D1+D2+D3$$

In a step 500, the electromagnetic valve 3 is driven by the electromagnetic valve driving duty D.

In a step 600, it is determined whether the speed-change operation has been completed or not. Until completed, the process returns to the step 200 and the above-described process is repeated. When completed, on the other hand, the above-described process ends.

The characteristics change of the fluid pressure regulating device relative to the influence of the above-described control process is discussed herein. It is assumed that the constants k1, k2 and k3 in the step 200 is matched to values which will provide the most appropriate response at the specified line pressure PL=PL1 of the fluid pressure regulating device, i.e., at the input side of the electromagnetic valve 3. Figs. a through 4E illustrates, under this assumption, changes in the rotational speed of the input shaft 12 and each duty D1, D2, D3 and D (D=D1+D2+D3), respectively, all under the speed-change operation. As understood from Figs. a and 4D, the actual rotational speed Nt1 of the input shaft 12 follows the target rotational speed Nto and the output duty D3 is zero, during the speed-change operation.

Contrary to Figs. a through 4E, FIGS. 5A through 5D illustrate the case that the same speed-change is performed without compensation by the output duty D3 when the fluid pressure is changed to PL2 from PL1. In this case, because the fluid line pressure is decreased, the clutch pressures for the same duty values are decreased and the speed-change operation delays and takes longer time than in the above-described case. In the conventional control method, the decrease in the fluid line pressure is detected and the constants K1, k2 and k3 are switched from one value to the other. For this purpose, the constants k1, k2 and k3 have to be matched to all the fluid line pressures.

FIGS. 6A through 6E illustrate the case in which the same speed-change operation as above is performed when the fluid line pressure is decreased to PL2 from PL1. In this case, however, the decrease in the fluid line pressure is estimated by the calculation of the duty D3 and taken into consideration as the disturbance to the system. Because the influence of the decrease in the fluid line pressure is converted into the duty D3 by the calculation of D3=D30–D31, the change in the actual rotational speed Nt1 of the input shaft 12 can be made to follow the target rotational speed Nto during the speed-change operation by adding the duty D3 to the duty D1+D2 for driving the electromagnetic valve 3. Thus, the constants k1, k2 and k3 need not be changed.

In the second embodiment of the present invention to follow, the same reference numerals are used to denote the same or like parts and functions and only a part thereof different from the first embodiment is described with reference to FIGS. 7 and 8 which illustrate, respectively, the control process in block diagram and in flow chart.

Figure 7:
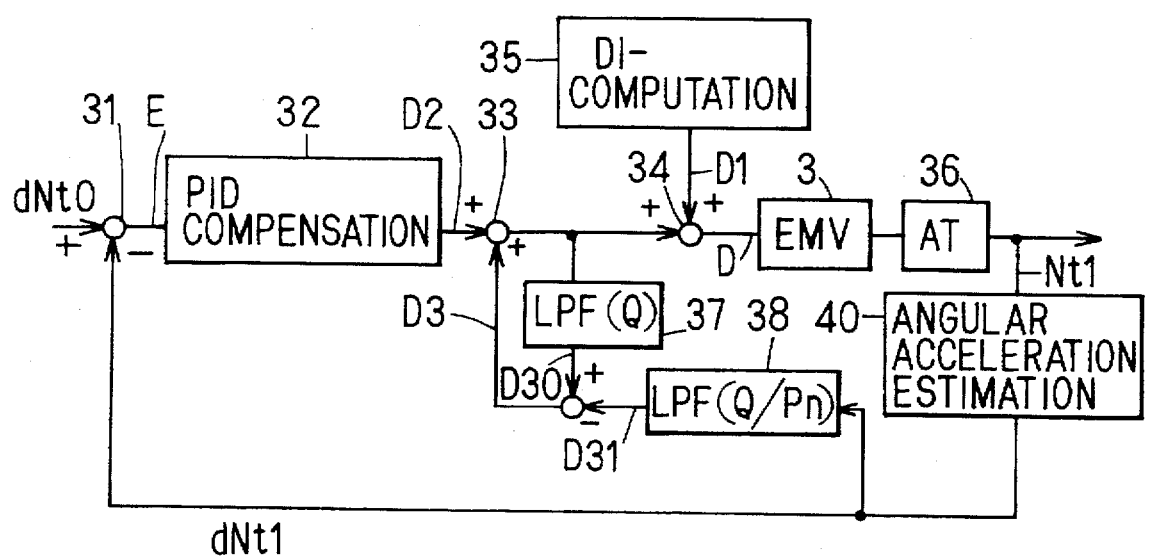
FIG. 7 is a block diagram illustrating a controller using a tangent of a rotational speed of the input shaft as the input thereto according to a second embodiment of the present invention.

Referring to FIG. 7, as the target of the control, a speed change rate, i.e., tangent, dNto of the rotational speed of the input shaft 12 is applied to the comparison section 31, and an actual tangent dNt1 of the actual rotational speed Nt1 of the input shaft 12 is applied to the comparison section 31 and the filter 38. The actual tangent dNt1 is derived by applying the actual rotational speed Nt1 of the input shaft 12 to an angular acceleration estimation section 40.

In the step 200 following the step 100, the error E is computed as follows from the target tangent dNto of the rotational speed of the input shaft 12 and the actual tangent dNt1 of the actual rotational speed Nt1 computed at the predetermined time interval.

$$D2=k1\times E+k2\times\int Edt+k3\times(d/dt)\times E$$

In the step 300, the duty D3 is derived by applying the actual tangent dNt1 of the rotational speed to the filter 38, and the duty D3 is computed as follows.

$$D3=D30-D31$$

In this computation, Pn denotes the transfer function model covering from the electromagnetic valve driving duty D to the actual tangent dNt1 of the rotational speed of the input shaft 12 and preferably be set to a fixed value or a delay system. The steps 400 through 600 are performed in the same manner as in the first embodiment.

The present invention should not be limited to the above-described embodiments but may be modified in many ways. It may be applied to other types of automatic transmissions so constructed as controlling the clutch engagement pressure by regulating the back pressure or the fluid line pressure of an accumulator.

The present invention has the following advantages. (1) Because the various changes in the fluid temperature, speed-change gear position, input shaft torque, operational condition of the lock-up device and on/off condition of the power mode (depression/release of the accelerator pedal), time-dependent change of the friction coefficient of the friction element and variations among the friction elements, and time-dependent change of the fluid pressure regulating device and variations among the fluid pressure regulating devices can be estimated as the disturbance, a matching data map need not be provided in correspondence to those changes and variations or may be simplified, and the control process program may be simplified. Further, the control system may be constructed with ease even in the case that the engine is changed from one type to the other. (2) Because the disturbance which cannot be provided as the matching data map in the electronic controller, such as variation in the friction coefficient of the friction elements or the variation in the accuracy of pressure regulation and the fluid pressure regulating device can be estimated, the influence of those variations on the operation of the automatic transmission can be reduced to the minimum. This is more advantageous than increasing the proportional control gain of the PID control, which will otherwise cause instability of the system.

What is claimed is:

1. A method of controlling a speed-change transient mode of an automatic transmission having an input shaft at an engine side, an output shaft at a wheel side and a friction element for a speed-change between the shafts by regulating a fluid pressure regulated by a pressure regulating device and applied to the friction element, said method comprising the steps of:

detecting an actual value representative of rotation of the input shaft;

computing a control value based on a difference between said detected value and a target value representative of rotation of the input shaft;

estimating a disturbance from the control value and the detected value, said disturbance corresponding to an error from a predetermined transfer function model which defines a model from an application of the control value to the pressure regulating device to a change in the rotation of the input shaft and is stored; and correcting the control value to the pressure regulating device using the estimated disturbance.

2. A method according to claim 1, wherein said estimating step includes the steps of:

receiving said detected value;

receiving said control value; and estimating said disturbance using said detected value as a first parameter and said control value as a second parameter distinct from said first parameter.

3. A method according to claim 1, wherein said target value representative of rotation of said input shaft is a target rotational speed of said input shaft, and said actual value representative of rotation of said input shaft is an actual rotational speed of said input shaft.

4. A method according to claim 1, wherein said target value representative of rotation of the input shaft is a target rotational speed change of said input shaft, and said actual value representative of rotation of said input shaft is an actual rotational speed change of said input shaft.

5. An apparatus for an automatic transmission having an input shaft at an engine side, an output shaft at a wheel side and a speed-change mechanism with friction element controlled by a pressure applied thereto through a pressure regulating device, said apparatus comprising:

target setting means for setting a target value related to a rotation of the input shaft;

detecting means for detecting an actual value related to the rotation of the input shaft;

error calculation means for calculating an error between the target value and the actual value to derive a control value;

disturbance estimation means for estimating a disturbance from the control value and the actual value based on a predetermined function defining a transfer model from an application of the control value to the pressure regulating device to a change in the rotation of the input shaft; and control means for controlling the pressure regulating device in accordance with the control value derived from the calculated error and the estimated disturbance.

6. An apparatus according to claim 5, wherein said disturbance estimation means includes:

first filter means for calculating a first value from the control value based on a first predetermined function;

second filter means for calculating a second value from the actual value based on a second predetermined function; and subtracter means for subtracting the second value from the first value to estimate the disturbance.

7. An apparatus according to claim 5, wherein said disturbance estimation means comprises:

target value receiving means for receiving said target value from said target setting means;

actual value receiving means for receiving said detected value from said detecting means; and means for estimating said disturbance using said target value received by said target value receiving means as a first parameter and said actual value received by said actual value receiving means as a second parameter distinct from said first parameter.

8. An apparatus according to claim 5, wherein said target value related to rotation of the input shaft is a target rotational speed of said input shaft, and said actual value is an actual rotational speed of said input shaft.

9. An apparatus according to claim 5, wherein said target value related to rotation of the input shaft is a target rotational speed change of said input shaft, and said actual value is an actual speed change of said input shaft.

* * * * *